United States Patent Office 2,784,111
Patented Mar. 5, 1957

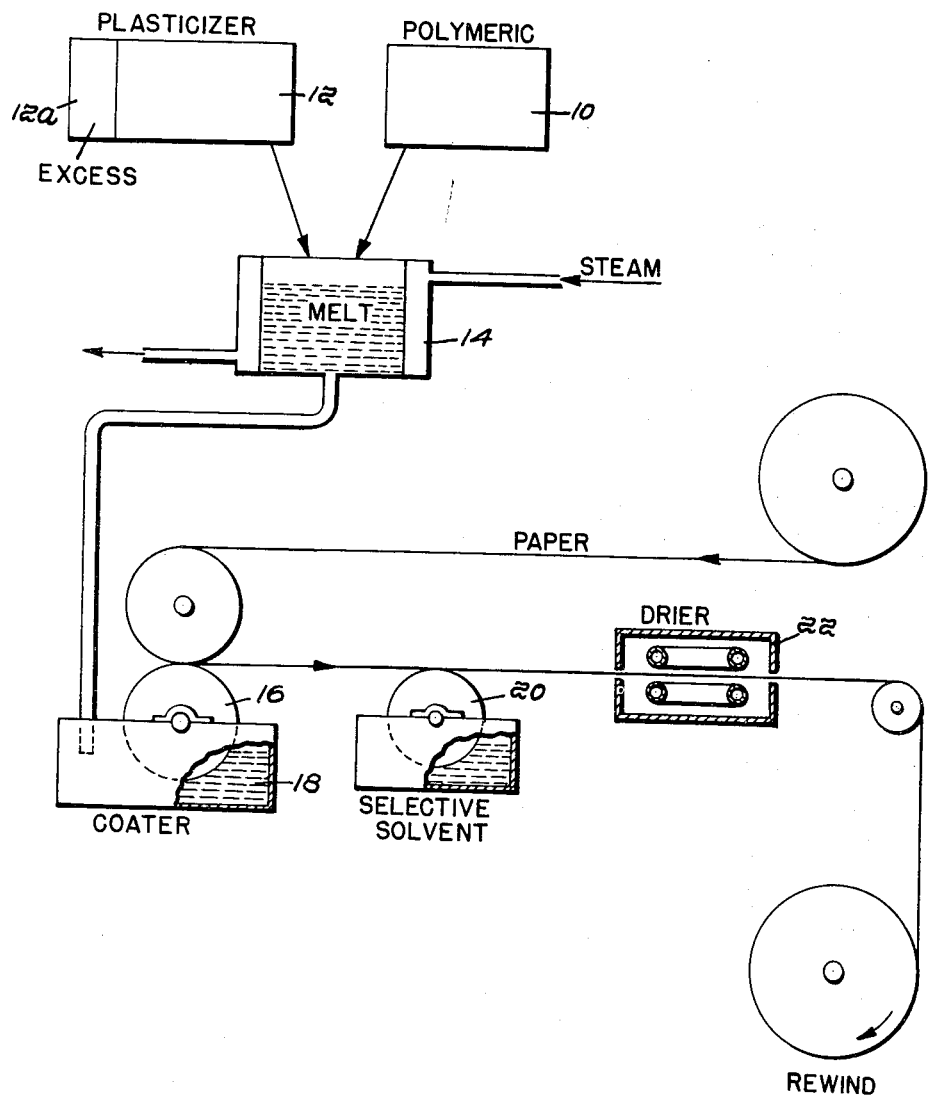

2,784,111

MANUFACTURE OF DOUBLE PHASE ADHESIVE FILMS

Austin E. Davis, Nashua, N. H., assignor to Nashua Corporation, Nashua, N. H., a corporation of Massachusetts Application July 12, 1954, Serial No. 442,521

2 Claims. (Cl. 117—63)

This invention relates to the manufacture of thermosensitive adhesive films of the double phase type described in United States Patent 2,462,029 to Perry, and the object is to provide an advantageous method for preparing one sub-type of such double phase films.

My invention will be well understood by reference to the following description thereof, taken in connection with the accompanying drawing which diagrammatically discloses the manipulations of the process. This drawing is quite unrealistic and probably will be of use chiefly as a sort of graphical memorandum of the subject matter for the convenience of those who may have occasion hereafter to make use of the patent.

The Perry patent above referred to describes an adhesive in the form of a film, normally solid and megascopically homogeneous, which is non-tacky at room temperature but activatable to adhesiveness by heat, and wherein the temperature at which it exhibits incipient tackiness (which might cause blocking or premature sticking of one coated sheet to another or to an external object) is relatively high. An amorphous potentially viscid polymeric material which exhibited such a high incipient tackiness would in general become usefully adhesive only at an inconveniently high temperature.

Perry therefore provided a film containing such an amorphous polymeric ingredient and also a potential plasticizer of a generally crystalline character for such amorphous material which was present in solid form and mechanically admixed with the polymeric material. This was the first phase of the film. On heating the ingredients became fluid and merged. In a sense the result was a new, plasticized material, adhesive at a relatively low temperature, and retaining this character for an extended period of time after substantial cooling. This was the second phase. In fact the second phase film might remain usefully adhesive when cooled to room temperature, and be used as a pressure-sensitive adhesive. This was then a case where the temperature of useful adhesiveness of the film in its second stage was lower than the temperature of initial tackiness of the first stage.

Many films so compounded, although amorphous (as indicated by substantial translucency) and more or less viscid when cooled become on prolonged standing opaque and hard, indicating reappearance of crystalline material therein. This may be explained by saying that the film when first cooled existed in a supercooled or supersaturated state, the polymeric constituent containing merged therewith an excess of crystalline material beyond what would be normally compatible therewith at room temperature. This excess may crystallize out eventually, leaving the polymeric material no longer supersaturated but in a saturated form, the recrystallized excess then mechanically admixed with the plasticized polymer.

While such a film, after recrystallization of the excess, would not be a precise reconstitution of the first phase as above described, it may in suitable formulations have quite a high temperature of incipient tackiness and, after activation a desirably low temperature of useful adhesiveness, the film reverting to and retaining for a substantial length of time its supercooled state. It would thus be a double phase adhesive film exemplifying the Perry invention and would be duplicated if there were used in its manufacture the same polymeric material originally softened or plasticized to the limit of its compatibility with the plasticizer at normal temperatures (and in a sense equivalent to an unplasticized material of similar properties as regards its physical state at different temperatures) and a substantially crystalline plasticizer mechanically admixed therewith, this crystalline plasticizer being excess as above referred to.

In certain instances, to prepare double phase film by coating paper or the like with a melt may present advantages. However, it will be clear that if we prepare a melt of a polymeric material with a compatible plasticizer in excess corresponding to the condition of the film above described after its initial activation by heat, it would supercool as a tacky coating on the paper. The original fluid coating would be a solution of one normally solid material in another with the components forming a molecular mixture (mixture on a molecular scale) as in the usual case of a solid dissolved in a liquid. This solution if supercooled on setting under normal atmospheric conditions will still exhibit this state of molecular mixture as in the analogous and more familiar case of the solution of a solid in a liquid. Practically we cannot wait days or hours for the excess gradually to recrystallize.

My invention provides for breaking the supercooling and causing the excess plasticizer to crystallize out in a matter of seconds thus permitting a continuous process whereby the melt may be coated on paper, recrystallization effected so that the coating will not block, and the paper rewound or otherwise handled, all in immediate sequence.

It is a well-known teaching of elementary physics that supersaturated solutions may be broken and the excess of solute caused to crystallize out by "seeding" with solid crystals of the solute. Indeed it is possible to so seed a melt coating like that under discussion, conveniently by applying a slurry in which very fine seed crystals are dispersed, but such a process has disadvantages.

In accordance with my invention I coat a carrier of paper or the like (all over its surface or in limited areas thereof) from a melt of a coatable consistency, and while the coating is still mobile but at a temperature below the melting point of the plasticizer, moisten the surface with a volatile liquid in which the crystalline plasticizer is more readily dissolved than is the polymeric material.

A further understanding of the invention will be had from the following specification with the illustrative examples given therein taken in connection with the accompanying drawing which is a diagram.

In the diagrammatic drawing the two rectangles 10 and 12 at the top of the sheet indicate respectively the amorphous polymeric material and the plasticizer which are to be mixed, and it will be noted that the left-hand rectangle representing the plasticizer is larger than that representing the amorphous material and that a certain portion, 12a, of its area is ruled off and marked "excess." This does not mean that equal weights or volumes of amorphous material and plasticizer would necessarily be compatible, but is merely a diagrammatic indication of the use of an excess amount of solid plasticizer in the sense already described. Suitable relative proportions of the amorphous material or materials and the plasticizer are melted together as indicated by the diagrammatic showing of a steam-heated kettle 14. This melt is then coated on a paper web or like carrier by any suitable method of the coating art, herein represented diagrammatically by a roll coater of simple form, having a roll 16 revolving in a bath 18 of the coating material and lifting it therefrom and applying it to the surface of the paper. The coating may be a continuous coat applied by any suitable means or in strips applied by a ribbed roll or in other separated areas applied by an intaglio roll, etc. Thereupon the surface of the coating film is moistened with the solvent. By moistening I refer to a superficial wetting which may be compared to that of the adhesive on a postage stamp when licked by the tongue. This is diagrammatically shown in the drawing by the illustration of a roll 20 fed with the solvent. In general a metal roll, moving with or in reverse to the travel of the paper web, may be practically used. To economize space it is desirable then to pass the web through a drier diagrammatically shown at 22, effective to evaporate the solvent, the drier being located quite close to the coating roll, so that only a second or so elapses. No elaborate drying mechanism is required. On exit from the drier the coating will have been recrystallized so that the paper may be further processed in web form or sheeted or rewound without danger of blocking.

While the effectiveness of the process has been empirically demonstrated and I therefore do not desire to be limited to any theory of the physical phenomena involved, it seems reasonable to infer the action to be substantially as follows. The solvent dissolves and possibly extracts or leaches out from the merged polymeric and crystalline materials a portion of the latter. This perhaps occurs in very small amounts throughout the superficial area of the coating. Such dissolved portions of the crystalline material are no longer entangled with a semisolid and viscous complex, but are in a mobile liquid from which crystallization is very easy. The solvent quickly evaporates, depositing seed crystals in the semisolid coating layer and causing rapid recrystallization of the excess. By this method recrystallization has been effected to provide a tack free surface in the space of seconds from films of melt mixtures which require many hours at 70° F. to recrystallize spontaneously to a sufficient degree to make them tack free. It seems reasonable to postulate that minute droplets of the solution are formed at innumerable places and, at least superficially, within the mass of the film, occupying spaces formerly occupied by minute masses of the solute.

*Example 1*

80 parts diphenyl phthalate, crystalline component
20 parts polystyrene, polymeric component
Denatured ethyl alcohol, solvent liquid
Normal time for spontaneous recrystallization from melt (70° F.): more than 24 hours

*Example 2*

80 parts diphenyl phthalate, crystalline component
20 parts cellulose aceto butyrate, polymeric component
Denatured ethyl alcohol, solvent liquid
Normal time for spontaneous recrystallization from melt (70° F.): more than 24 hours

*Example 3*

80 parts diphenyl phthalate, crystalline component
20 parts cellulose aceto butyrate, polymeric component
Methanol, solvent liquid
Normal time for spontaneous recrystallization from melt (70° F.): more than 24 hours

*Example 4*

80 parts dicyclohexyl phthalate, crystalline component
20 parts cellulose aceto butyrate, polymeric component
Denatured ethyl alcohol, solvent liquid
Normal time for spontaneous recrystallization from melt (70° F.): more than 24 hours

*Example 5*

80 parts cyclohexyl para toluene sulfonamide, crystalline component
20 parts cellulose aceto butyrate, polymeric component
Mixture of equal parts denatured ethyl alcohol and water, solvent liquid
Normal time for spontaneous recrystallization from melt (70° F.): more than 24 hours

*Example 6*

72 parts diphenyl phthalate, crystalline component
7.5 parts polystyrene ⎫
7.5 parts styrene-butadiene copolymer ⎬ polymeric component
7.0 parts indene resin ⎪
6.0 parts polymerized rosin (Synthetics A-56) ⎭
Denatured ethyl alcohol, solvent liquid
Normal time for spontaneous recrystallization from melt (70° F.): more than 24 hours

*Example 7*

48 parts cyclohexyl para toluene sulfonamide ⎫ crystalline component
24 parts tri (para tert-butyl phenyl) phosphate ⎭
7.5 parts polystyrene ⎫
7.5 parts styrene-butadiene copolymer ⎬ polymeric component
10.0 parts pentalyn G resin ⎪
3.0 parts Synthetics A-56 resin ⎭
Mixture of equal parts denatured ethyl alcohol and water, solvent liquid
Normal time for spontaneous recrystallization from melt (70° F.): more than 1 month The polystyrene of Example 1 is of low molecular weight produced by the Koppers Co. as grade KPTL-4.

The cellulose aceto butyrate referred to is manufactured by Eastman Chemical Products, Inc. and designated grade EAB-500-1.

The polystyrene of Examples 6 and 7 is supplied by Monsanto Chemical Co. as X-600 Latex.

The styrene-butadiene copolymer referred to is the polymerized reaction product of 60 parts styrene and 40 parts butadiene, supplied by Dow Chemical Co. as 513 Latex.

The indene resin referred to is a grade known as Nevindene R-3 and is supplied by the Neville Co.

The Pentalyn G resin referred to is a pentaerythritol ester of rosin and is supplied by Hercules Powder Co.

The Snythetics A-56 resin referred to is a polymerized rosin derivative and is supplied by Hercules Powder Co.

The denatured ethyl alcohol employed is a proprietary liquid supplied by Carbide and Carbon Chemicals Corp. under the trade name Synasol.

The methanol of Example 3 is a commercial grade supplied by Commercial Solvents Corp.

It will be noted that Examples 1 and 2 show the same crystalline component and the same solvent liquid used with different polymeric components. Examples 2 and 3 show different solvents used with the same solid component. Examples 4 and 3 show different crystalline components and different solvent liquids with the same polymeric component while Examples 4 and 2 show different crystalline components and the same solvent liquid and the same polymeric component. Example 5 shows still a third crystalline component and a third solvent liquid with the same polymeric component as in the previous examples.

Example 6 shows a polymeric component comprising a mixture of ingredients. Example 7 shows a polymeric component generally similar to that of Example 6 but the crystalline component is a mixture of two ingredients. The physical properties of the materials used that is, their relative solubilities one in another and their softening or melting points, are the significant factors involved in any formulation.

In the case of the first six examples a film formed from the fusion product of the solid ingredients left standing at 70° F. required more than twenty-four hours to recrystallize to a non-tacky state. The result was reached in accordance with the invention in less than a minute. In the case of Example 7 the contrast is even more striking, between more than a month in the one case and approximately a minute in the latter.

The word "film" as used herein refers to an extended layer, the thickness of which is not markedly different from that of an adhesive coating as usually provided on a label, an adhesive tape, etc. It would not be greater than a few mils in thickness and might be less than one mil. The word "excess" is used to signify an amount of predominately crystalline solid material exceeding that amount which would completely merge with the polymeric material to provide after cooling a substantially translucent non-tacky film.

I am aware that the invention may be embodied in other specific forms without departing from the spirit or essential attributes thereof, and I therefore desire the present embodiment to be considered in all respects as illustrative and not restrictive, as is in fact clear in several matters from the description itself. Reference is to be had to the appended claims to indicate those principles of the invention exemplified by the particular embodiment described and which I desire to secure by Letters Patent.

I claim:

1. In the manufacture of normally solid, non-tacky, megascopically homogeneous adhesive films of the double phase type which comprise an amorphous, polymeric, potentially adhesive ingredient and normally solid, crystalline plasticizer therefor, which plasticizer is compatible with the polymeric material and is present in excess, which excess is admixed in solid form with the polymeric material and will merge with the polymeric ingredient on heating, and on subsequent cooling to a lower temperature remain merged therewith in a supercooled state for a substantial length of time, the method which comprises melting together the plasticizer and polymeric material to provide substantially complete merger of the same as a coatable fluid, forming a film from the melt and then moistening an exposed face of the film before it has set but while at a temperature below the melting point of the crystalline material with a volatile liquid which dissolves the plasticizer more readily than it does the polymeric material whereby to expedite separation of the excess in crystalline form and volatilizing said liquid as the film sets.

2. In the manufacture of normally solid, non-tacky, megascopically homogeneous adhesive films of the double phase type which comprise an amorphous, polymeric, potentially adhesive ingredient and normally solid, crystalline plasticizer therefor, which plasticizer is compatible with the polymeric material and is present in excess, which excess is admixed in solid form with the polymeric material and will merge with the polymeric ingredient on heating, and on subsequent cooling to a lower temperature remain merged therewith in a supercooled state for a substantial length of time, the method which comprises forming a coatable fluid wherein the plasticizer and polymeric material are homogeneously molecularly mixed in proportions which on setting under normal atmospheric conditions would spontaneously assume such supercooled state, coating the fluid on a support and causing at least partial setting thereof so it remains extended over the support in the form of a film and thereupon moistening an exposed surface of the film while at a temperature below the melting point of the crystalline material with a volatile liquid which dissolves the plasticizer more readily than it does the polymeric material whereby to expedite separation of the excess in crystalline form and volatilizing said liquid as the film sets.

References Cited in the file of this patent

UNITED STATES PATENTS

| | | |
|---|---|---|
| 2,306,046 | Duggan | Dec. 22, 1942 |
| 2,462,029 | Perry | Feb. 15, 1949 |
| 2,678,284 | Holt | May 11, 1954 |